US012585163B2

(12) United States Patent
Iwasaki et al.

(10) Patent No.: US 12,585,163 B2
(45) Date of Patent: Mar. 24, 2026

(54) CAMERA DEVICE AND ELECTRONIC APPARATUS

(71) Applicant: AAC OPTICS SOLUTIONS PTE. LTD., Singapore (SG)

(72) Inventors: Takashi Iwasaki, Osaka (JP); Kazuo Shikama, Osaka (JP)

(73) Assignee: AAC OPTICS SOLUTIONS PTE. LTD., Singapore City (SG)

( * ) Notice: Subject to any disclaimer, the term of this patent is extended or adjusted under 35 U.S.C. 154(b) by 334 days.

(21) Appl. No.: 18/539,279

(22) Filed: Dec. 14, 2023

(65) Prior Publication Data

US 2025/0036007 A1      Jan. 30, 2025

(30) Foreign Application Priority Data

Jul. 25, 2023      (JP) ................................. 2023-120809

(51) Int. Cl.
*G03B 3/00*          (2021.01)
*G03B 3/10*          (2021.01)
*G03B 5/02*          (2021.01)
*G03B 17/12*         (2021.01)

(52) U.S. Cl.
CPC ................. *G03B 3/10* (2013.01); *G03B 5/02* (2013.01); *G03B 17/12* (2013.01); *G03B 2205/0023* (2013.01); *G03B 2205/0069* (2013.01)

(58) Field of Classification Search
CPC . G03B 3/10; G03B 5/02; G03B 17/12; G03B 2205/0023; G03B 2205/0069; G03B 5/00; G03B 13/34; G03B 30/00; G02B 7/04; H04N 23/54; H04N 23/687; G11B 7/0908; G11B 7/0925; G11B 7/0927; G11B 7/0929; G11B 7/093; G11B 7/0937; H02K 41/0354; H02K 41/0356
USPC ......................................................... 359/824
See application file for complete search history.

(56) References Cited

U.S. PATENT DOCUMENTS

2024/0337910 A1* 10/2024 Kim ......................... G03B 5/00

* cited by examiner

*Primary Examiner* — Henry Duong
(74) *Attorney, Agent, or Firm* — Wiersch Law Group

(57) ABSTRACT

The present disclosure relates to the field of optics and discloses a camera device. The camera device includes a driving mechanism and a lens module. The driving mechanism includes a base with a first magnetic yoke and a driving coil, and a first frame with a magnet and an inclined supporting surface. The lens module includes a lens holder, and the first frame supports the lens holder via the inclined supporting surface. When the driving coil is energized, the first frame is driven to rotate, and the first frame drives the lens holder to move in the direction of the optical axis or tilt with respect to the optical axis via the rotating inclined supporting surface. The camera device and the electronic apparatus require no leaf spring, thereby avoiding the problem of control performance degradation and weight distribution caused by the leaf spring.

15 Claims, 12 Drawing Sheets

CAMERA DEVICE AND ELECTRONIC APPARATUS

TECHNICAL FIELD

The present disclosure relates to the field of optics, and more particularly, to a camera device and an electronic apparatus.

BACKGROUND

With the rapid development of photography technology, driving mechanisms for driving lenses to move are widely used in various camera devices, and such camera devices are also applied to various mobile devices. A commonly used driving mechanism of a camera device typically drives the lens to move in the direction of the optical axis or in a plane perpendicular to the optical axis. Such driving mechanisms mostly include a driving coil and a magnet. The driving coil is fixed to the outer peripheral side of the lens frame. When the driving coil is energized to generate a magnetic field, the lens in the lens frame moves in the direction of the optical axis under the action of electromagnetic force to realize focusing function, and the lens in the lens frame moves in a plane perpendicular to the optical axis or swings around the principal point of the lens to realize anti-shake correction function.

Such driving mechanisms are usually equipped with a leaf spring to elastically support and suspend the lens frame, keeping the lens frame in a non-contact state with other components, so that when an electromagnetic force is applied to the lens frame, the lens can achieve a linear movement effect. However, this kind of elastic support and suspension structure will produce resonance in the vibration mode, and suppressing the control performance degradation problem caused by resonance in the focusing process is an important topic in lens design. In addition, in the upper and lower leaf spring designs for controlling the inclination of the lens, the width design of the leaf spring will affect the weight distribution of the lens, thereby making the design and manufacturing of the entire lens more difficult.

Therefore, it is necessary to provide a camera device and an electronic apparatus to solve the above problems.

SUMMARY

The objective of the present disclosure is to provide a camera device and an electronic apparatus to solve the problem of control performance degradation caused by the resonance of the leaf spring in the driving mechanism, and the problem of weight distribution caused by the width of the leaf spring.

In order to implement the above-mentioned objective, the present disclosure provides a camera device, including a driving mechanism and a lens module having an optical axis, wherein the driving mechanism includes a base and a first frame rotatably provided on the base, the base is provided with a first magnetic yoke and a driving coil, the first frame is provided with a magnet and has a inclined supporting surface inclined with respect to the optical axis, the first magnetic yoke and the magnet are arranged opposite to each other in the direction of the optical axis, the magnet exerts an attractive force on the first magnetic yoke in the direction of the optical axis to press the first frame on the base;

the lens module includes a lens holder pressing on the first frame, and the first frame supports the lens holder via the inclined supporting surface;

when the driving coil is energized to generate a magnetic field, the first frame is driven by the magnet to rotate in a plane perpendicular to the direction of the optical axis, and the first frame drives the lens holder to move in the direction of the optical axis or tilt with respect to the optical axis via the rotating inclined supporting surface.

As an improvement, the camera device includes a plurality of the first frames, and the plurality of first frames are arranged on the base substantially equidistantly in a direction surrounding the optical axis.

As an improvement, the first frame is designated as four, and the four first frames are arranged in pairs opposite to each other, two of the first frames arranged opposite to each other is configured for driving the lens holder to move in opposite directions along the optical axis via the rotating inclined supporting surface, thereby driving the lens holder to rotate around a first direction perpendicular to the optical axis; the other two first frames arranged opposite to each other is configured for driving the lens holder to move in opposite directions along the optical axis via the rotating inclined supporting surface, thereby driving the lens holder to rotate around a second direction perpendicular to the optical axis and the first direction; the four first frames rotate simultaneously, so that the rotation of the lens holder in the first direction and the rotation in the second direction are superimposed, and the lens holder tilts with respect to the optical axis.

As an improvement, the plurality of the first frames drive the lens holder to move in the same direction along the optical axis via the rotating inclined supporting surface, thereby driving the lens holder to move along the optical axis direction.

As an improvement, the base is provided with a plurality of protruding rotation shafts corresponding to the plurality of first frames one by one, and each of the first frames is provided with a rotation shaft hole, and the rotation shaft is inserted through the corresponding rotation shaft hole to rotatably set the corresponding first frame on the base.

As an improvement, the height of the inclined supporting surface increases along the direction surrounding the corresponding rotation shaft.

As an improvement, the height of the inclined supporting surface increases in a clockwise direction around the corresponding rotation axis.

As an improvement, the height change trend and height change magnitude of each inclined supporting surface in the direction surrounding the corresponding rotation axis are the same.

As an improvement, the projection of the driving coil and the first frame in the direction of the optical axis intersects each other.

As an improvement, the lens holder is provided with a spherical support protrusion, and the inclined supporting surface abuts against the spherical support protrusion on the lens holder to support the lens holder via the spherical support protrusion on the lens holder.

As an improvement, the first frame is provided with a spherical protrusion, and the base abuts against the spherical protrusion on the first frame to support the first frame via the spherical protrusion on the first frame.

As an improvement, a position detecting element is provided on the base to detect the rotation amount of the first frame.

As an improvement, the lens module includes a lens fixed on the lens holder and a second magnetic yoke, the second magnetic yoke and the magnet are arranged opposite to each other in the direction of the optical axis, the magnet exerts an attractive force on the second magnetic yoke in the direction of the optical axis to press the lens holder on the first frame.

As an improvement, spherical protrusions are provided on the object-side surface and image-side surface of the lens holder, and recesses are provided on the first frame in contact with the spherical protrusions and receiving the spherical protrusions therein, the first frame applies force to the spherical protrusions of the lens holder via the recesses to press the lens holder on the first frame.

The present disclosure also provides an electronic apparatus, including a device main body, and a camera device as described above.

The present disclosure has the beneficial effects as follows. A first frame with an inclined supporting surface is provided on the base, and the inclined supporting surface is used to support the lens holder. When the driving coil on the base drives the first frame to rotate, the inclination of the supporting surface with respect to the lens holder will be caused, thereby causing the lens holder located on the inclined supporting surface to change position with respect to the optical axis, thus allowing the lens holder to drive the lens to move along the optical axis or tilt with respect to the optical axis, thereby achieving focusing function by moving the lens in the direction of the optical axis, and realizing anti-shake correction function by tilting the lens with respect to the optical axis. This kind of structural design realizes focusing and anti-shake functions by using an inclined supporting surface, without the need to additional set a leaf spring, thereby avoiding the problem of control performance degradation caused by the resonance of the leaf spring and the problem of weight distribution caused by the width of the leaf spring.

BRIEF DESCRIPTION OF THE DRAWINGS

One or more embodiments are illustratively described through the diagrams in the corresponding drawings. These illustrative descriptions do not constitute limitations on the embodiments. Components in the drawings with the same reference numeral label indicate similar components, unless otherwise specified. The diagrams in the drawings do not constitute proportional limitations.

SYMBOL DESCRIPTION

Figure 1:
FIG. 1 is a perspective view of a camera device according to an embodiment of the present disclosure.
Figure 1:
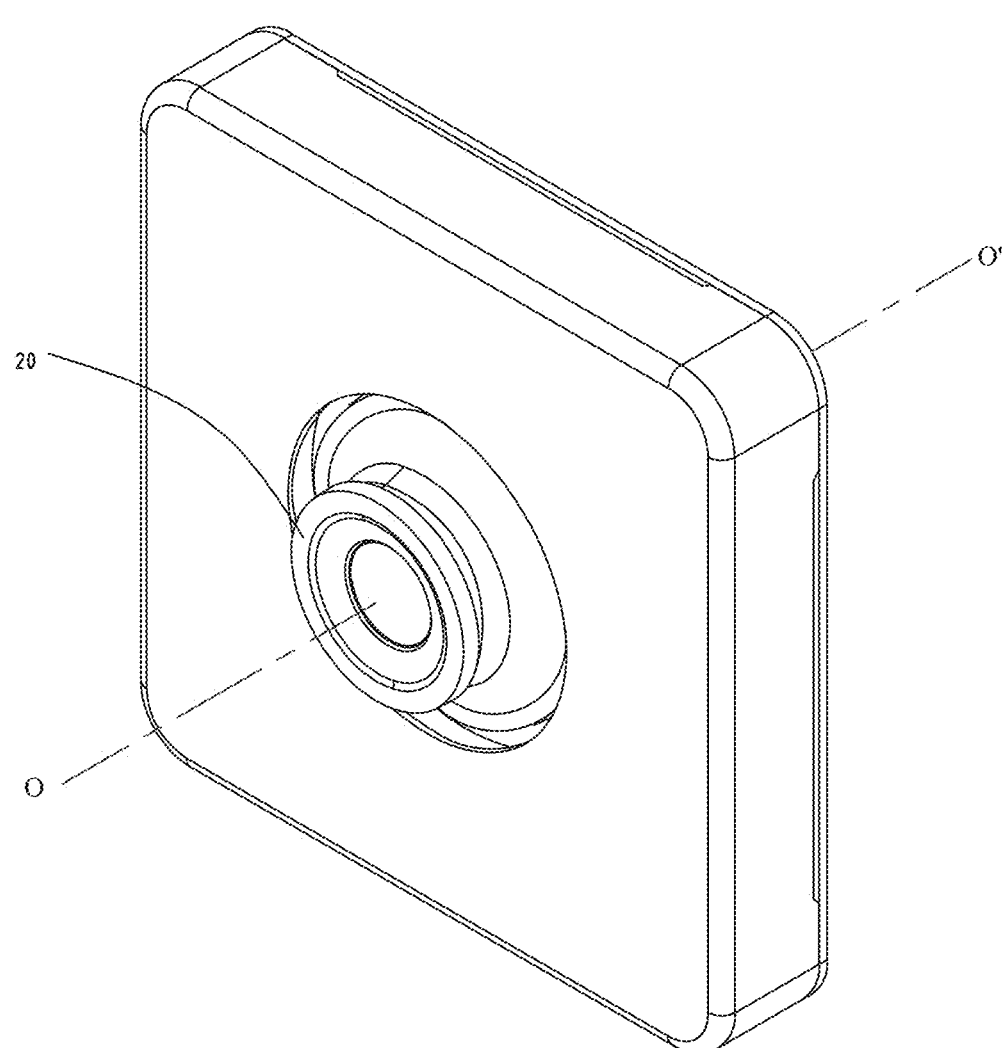
Figure 2:
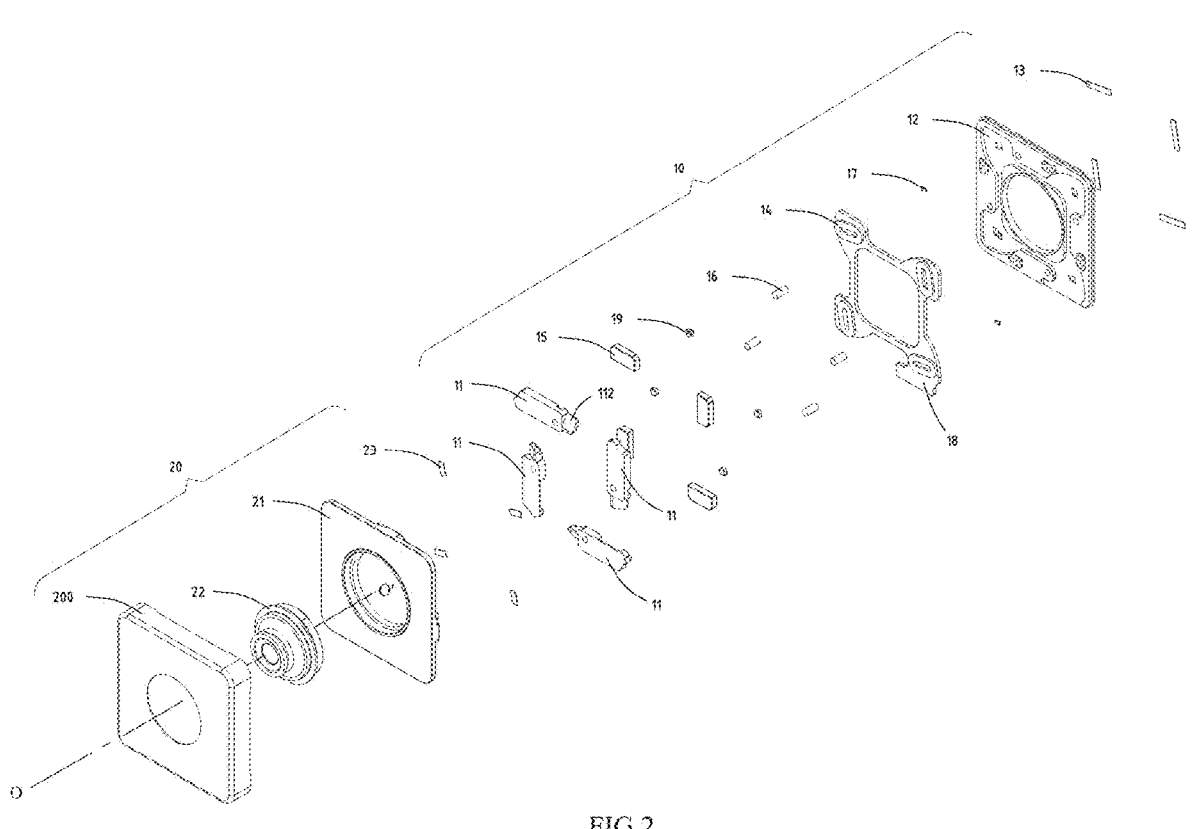
FIG. 2 is an exploded view of the camera device shown in FIG. 1.
Figure 3:
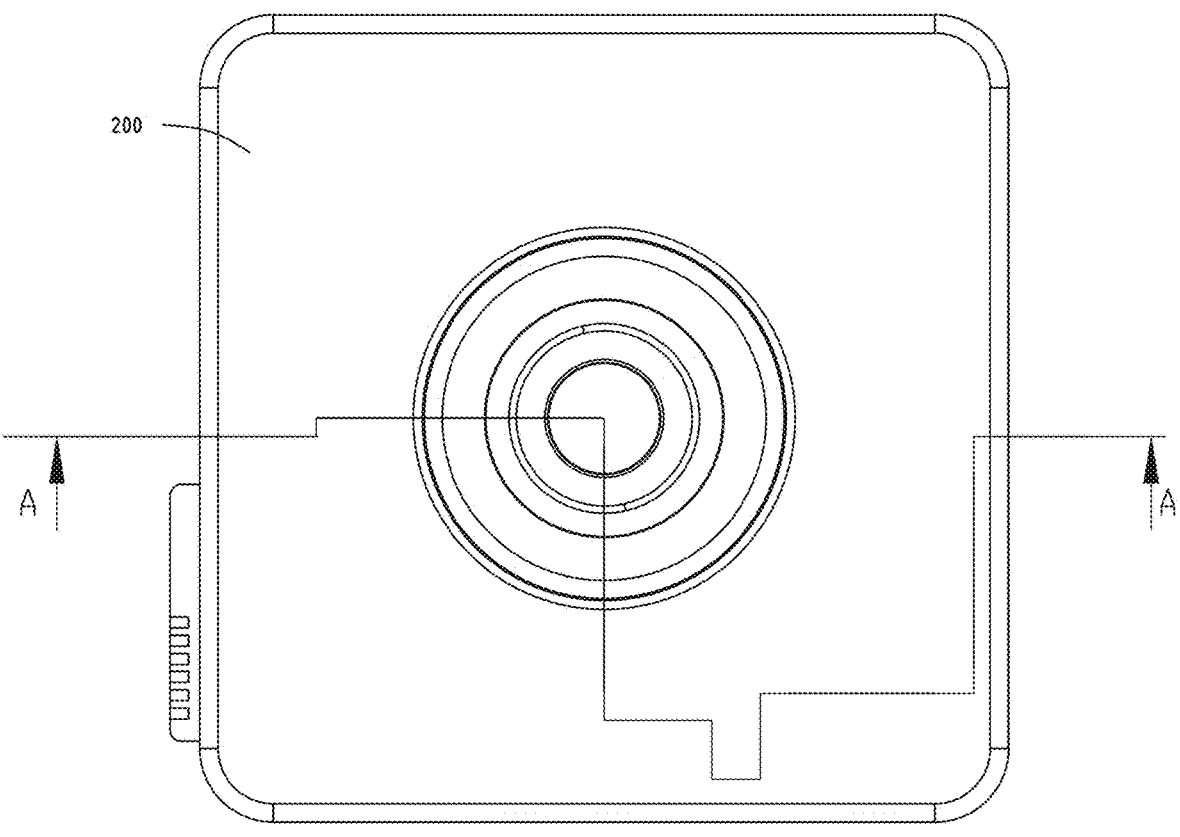
FIG. 3 is a top view of the camera device shown in FIG. 1.
Figure 4:
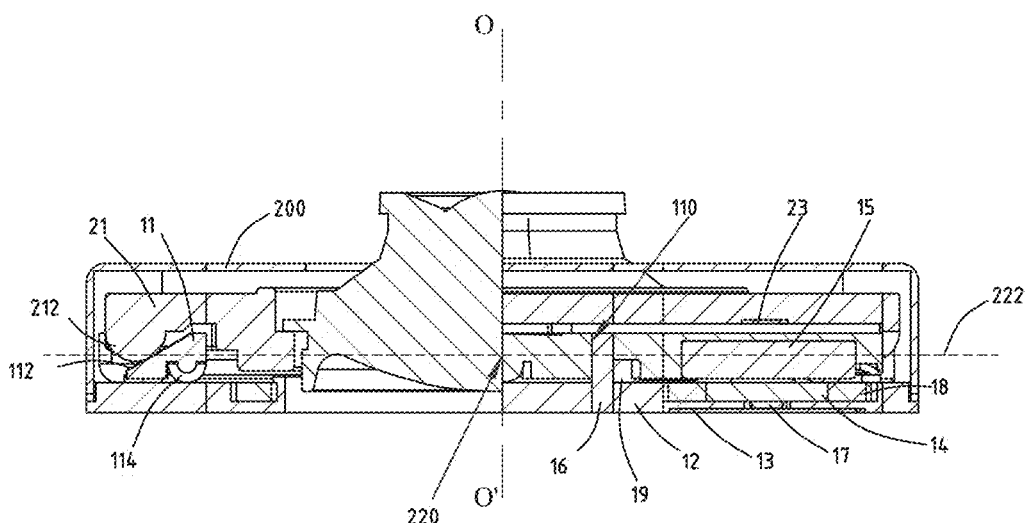
FIG. 4 is a sectional view taken along line AA in FIG. 3.
Figure 5:
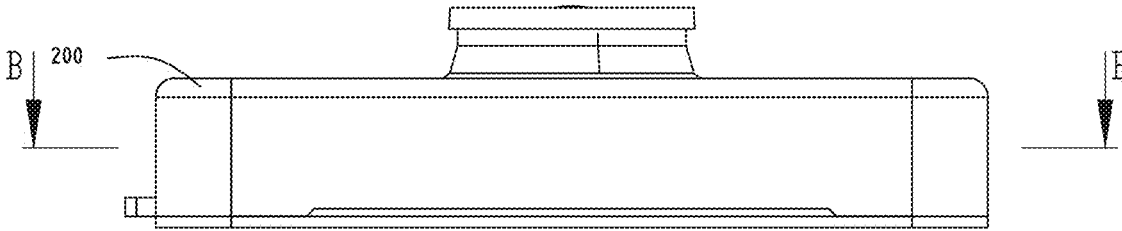
FIG. 5 is a side view of the camera device shown in FIG. 1.

100 Camera device
10 Driving mechanism
11 First frame
110 Rotation shaft hole
112 Supporting surface
114 Spherical projection
116 Recess
12 Base
13 first magnetic yoke
14 Driving coil
15 Magnet
16 Rotation shaft
17 Position detecting element
18 Flexible circuit board
19 Shock-absorbing gel
20 Lens module
200 Housing
21 Lens holder
210 Spherical projection
212 Spherical support projection
22 Lens
220 Principal point
222 Orthogonal plane
23 second magnetic yoke
300 Image sensing unit
400 Periscope optical mechanism
500 Aperture mechanism
600 Device main body

DETAILED DESCRIPTION

The following provides a detailed description of the implementation details of the camera device and electronic apparatus provided by the present disclosure. The following content is only implementation details provided for ease of understanding, and is not essential for implementing this solution.

The first embodiment of the present disclosure relates to a camera device 100, as shown in FIG. 1 to FIG. 6, including: a driving mechanism 10 and a lens module 20. The lens module 20 has an optical axis OO'. The driving mechanism 10 includes a base 12 and a first frame 11 rotatably disposed on the base 12. The base 12 is provided with a first magnetic yoke 13 and a driving coil 14 thereon. A magnet 15 is provided on the first frame 11 and has an orthogonal surface 222 inclined to the optical axis OO'. The first magnetic yoke 13 is arranged opposite to the magnet 15 on the first frame 11, in case of that no external force is applied (in the direction of the optical axis OO'). The magnet 15 applies an attractive force in the direction of the optical axis OO' to press the first frame 11 on the base 12. The lens module 20 includes a lens holder 21, a lens 22 and a second magnetic yoke 23. The lens 22 and the second magnetic yoke 23 are fixed to the lens holder 21, and the second magnetic yoke 23 is arranged opposite to the magnet 15 in the direction of the optical axis OO'. The magnet 15 applies an attractive force in the direction of the optical axis OO' to press the lens holder 21 on the first frame 11, and the first frame 11 is supported by the inclined supporting surface 112 supporting the lens holder 21. When the driving coil 14 is energized to generate a magnetic field, the driving coil 14 drives the first frame 11 to rotate in a plane perpendicular to the optical axis OO' via the magnet 15, and the first frame 11 drives the lens holder 21 to move along the optical axis OO' or tilt relative to the optical axis OO' via the rotating inclined supporting surface 112.

Compared with the prior art, in the embodiment of the present disclosure, a first frame 11 with an inclined supporting surface 112 is provided on the base 12, and the lens holder 21 is supported by the inclined supporting surface 112 of the first frame 11. When the driving coil 14 on the base 12 drives the first frame 11 to rotate, the movement of the inclined supporting surface 112 relative to the lens holder 21 will be caused, resulting in the position change of the lens holder 21 located on the inclined supporting surface 112 relative to the optical axis OO'. In this way, the lens holder 21 can drive the lens 22 to move along the optical axis OO' direction or tilt relative to the optical axis OO', thereby realizing the focusing function through the movement of the lens 22 in the direction of the optical axis OO', and realizing the anti-shake correction function through the tilt of the lens 22 relative to the optical axis OO'. Such a structural design realizes focusing and anti-shake functions by using the inclined supporting surface 112, without the need to provide additional leaf springs, avoiding the problem of control performance degradation caused by leaf spring resonance and the weight distribution problem caused by the width of the leaf spring.

Specifically, the driving mechanism 10 includes a first frame 11, a base 12 for supporting the first frame 11, a first magnetic yoke 13 and a driving coil 14 provided on the base 12, a magnet 15 provided on the first frame 11, and a rotation shaft 16 protruding from the base 12.

The first magnetic yoke 13 is provided on the base 12 and is arranged opposite to the magnet 15 in the direction of the optical axis OO' to be attracted by the magnet 15 along the direction of the optical axis OO', thereby pressing the first frame 11 on the base 12 to fix the first frame 11. The projection of the driving coil 14 and the first frame 11 along the direction of the optical axis OO' intersects each other.

The number of the first frames 11 is four, and the four first frames 11 are uniformly arranged on the base 12 along the direction surrounding the optical axis OO' and oppositely arranged in pairs. It can be understood that, in some feasible implementations, the first frames 11 are uniformly arranged on the base 12 at equal intervals along the direction surrounding the optical axis OO' approximately. Each first frame 11 is provided with a rotation shaft hole 110 and a inclined supporting surface 112 that is inclined with respect to the orthogonal plane 222 relative to the optical axis OO'. Correspondingly, the base 12 is also provided with four rotation shafts 16, and the rotation shaft holes 110 on each first frame 11 are correspondingly penetrated by the four rotation shafts 16, so that each rotation shaft 16 is rotatably fixed in the corresponding rotation shaft hole 110 to fix the corresponding first frame 11 on the base 12. In this way, each first frame 11 can rotate clockwise and counterclockwise around the corresponding rotation shaft 16. Furthermore, in a feasible implementation, the height of the inclined supporting surface 112 (i.e., the height of the inclined supporting surface 112 in the direction of the optical axis OO', in other words, the distance between the inclined supporting surface 112 and the plane where the base 12 is located) of each first frame 11 increases in the clockwise direction around the corresponding rotation shaft 16. It should be noted that the above design manner is only a feasible way to rotatably fix the first frame 11 on the base 12, and in other implementation manners, the first frame 11 can also be rotatably fixed on the base 12 through different structural design schemes. For example, the first frame 11 can be provided with a protruding shaft, and the base 12 can be provided with corresponding rotating recess/holes into which the protruding shaft extends, thereby rotatably fixing the first frame 11 on the base 12 through the protruding shaft inserted into the rotating recess/holes. It can be understood that for those skilled in the art, there are many other ways to rotatably fix the first frame 11 on the base 12, which will not be described one by one here.

Figure 7:
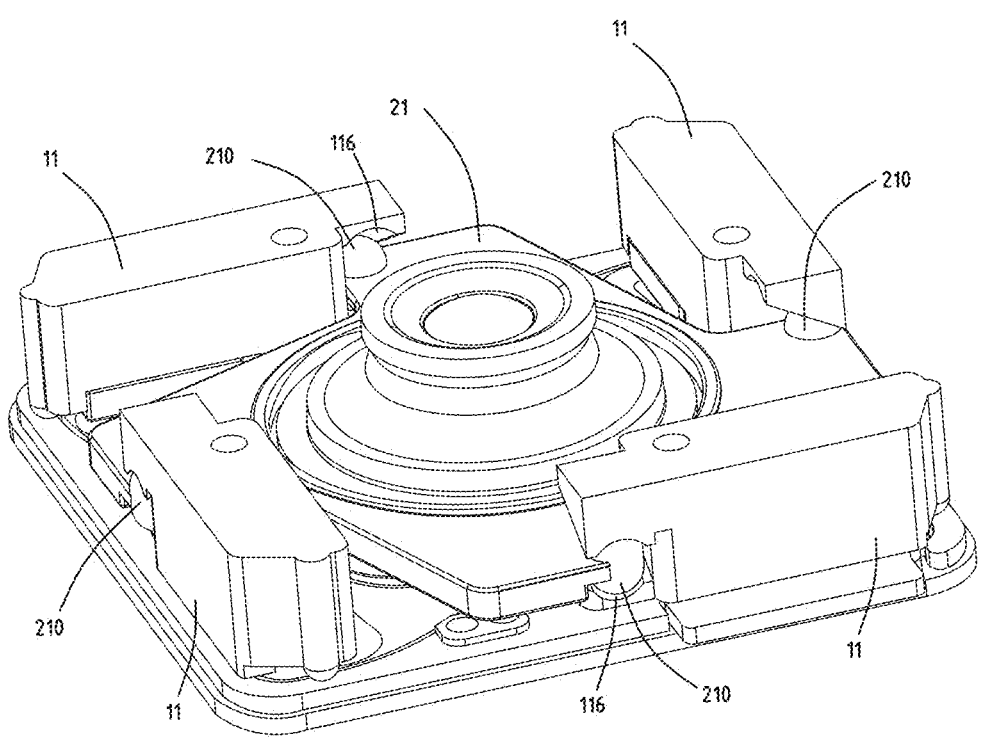
FIG. 7 is a perspective schematic view of the cooperation structure between the lens holder and the first frame of another camera device according to an embodiment of the present disclosure.
Figure 8:
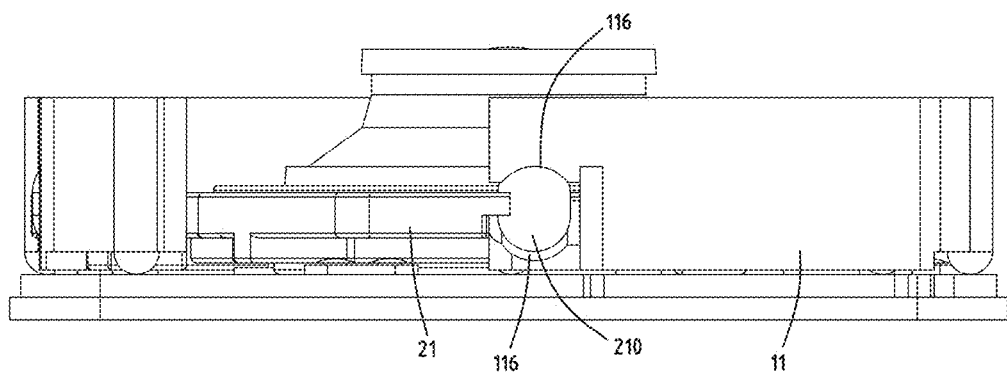
FIG. 8 is a side view of the cooperative structure between the lens holder and the first frame shown in FIG. 7.

The lens module 20 includes a housing 200 with a receiving space; a lens holder 21 provided in the receiving space, a lens 22 fixed on the lens holder 21, and a second magnetic yoke 23. The second magnetic yoke 23 is arranged opposite to the magnet 15 in the direction of the optical axis OO' and exerts an attractive force on the second magnetic yoke 23 along the direction of the optical axis OO' to press the lens holder 21 against the first frame 11, and the first frame 11 supports the lens holder 21 via the inclined supporting surface 112. It can be understood that in a modified implementation, the fixing of the lens holder 21 can be realized in a non-yoke manner. For example, as shown in FIG. 7 and FIG. 8, ball protrusions 210 can be provided on both sides of the lens holder 21 (the object-side surface and the image-side surface), and recesses 116 can be provided on the first frame 11 to contact and receive the ball protrusions 210, thereby applying force to the lens holder 21 without using the second magnetic yoke 23 according to the position of the first frame 11, and the inclined supporting surface is provided in the recess 116. It can also be understood that, the fixing of the lens holder 21 can also be realized by using elastic elements such as leaf springs. Specifically, an elastic element is provided between the lens holder 21 and the base 12 to press the lens holder 21 towards the first frame 11 and the base 12 along the direction of the optical axis OO'.

Furthermore, in a feasible implementation, a support protrusion 212 is provided on the lens holder 21, and the inclined supporting surface 112 abuts against the support protrusion 212 on the lens holder 21 to support the lens holder 21 via the support protrusion 212 on the lens holder 21.

When the driving coil 14 is energized to generate a magnetic field, the driving coil 14 drives the first frame 11 to rotate in a plane perpendicular to the optical axis OO' through the magnetic force applied to the magnet 15. The first frame 11 exerts force on the support protrusion 212 through the rotating inclined supporting surface 112, thereby driving the lens holder 21 to move along the optical axis OO' direction or to tilt relative to the optical axis OO'.

Specifically, since the height of the inclined supporting surface 112 increases in the clockwise direction around the corresponding rotation axis 16, when each of the first frames 11 rotates along the clockwise or counterclockwise direction around the corresponding rotation axis 16 at the same time, the lens holder 21 can be pushed along the optical axis OO' direction towards the image side or the object side via the rotating inclined supporting surface 112, thereby moving the lens 22 along the optical axis OO' direction through the lens holder 21.

In addition, controlling the number and rotation direction of the rotated first frames 11 can enable the first frames 11 to push the lens holder 21 towards the image side along the optical axis OO' direction at some positions, and towards the object side along the optical axis OO' direction at other positions, thereby tilting the lens 22 relative to the optical axis OO' through the lens holder 21.

Figure 6:
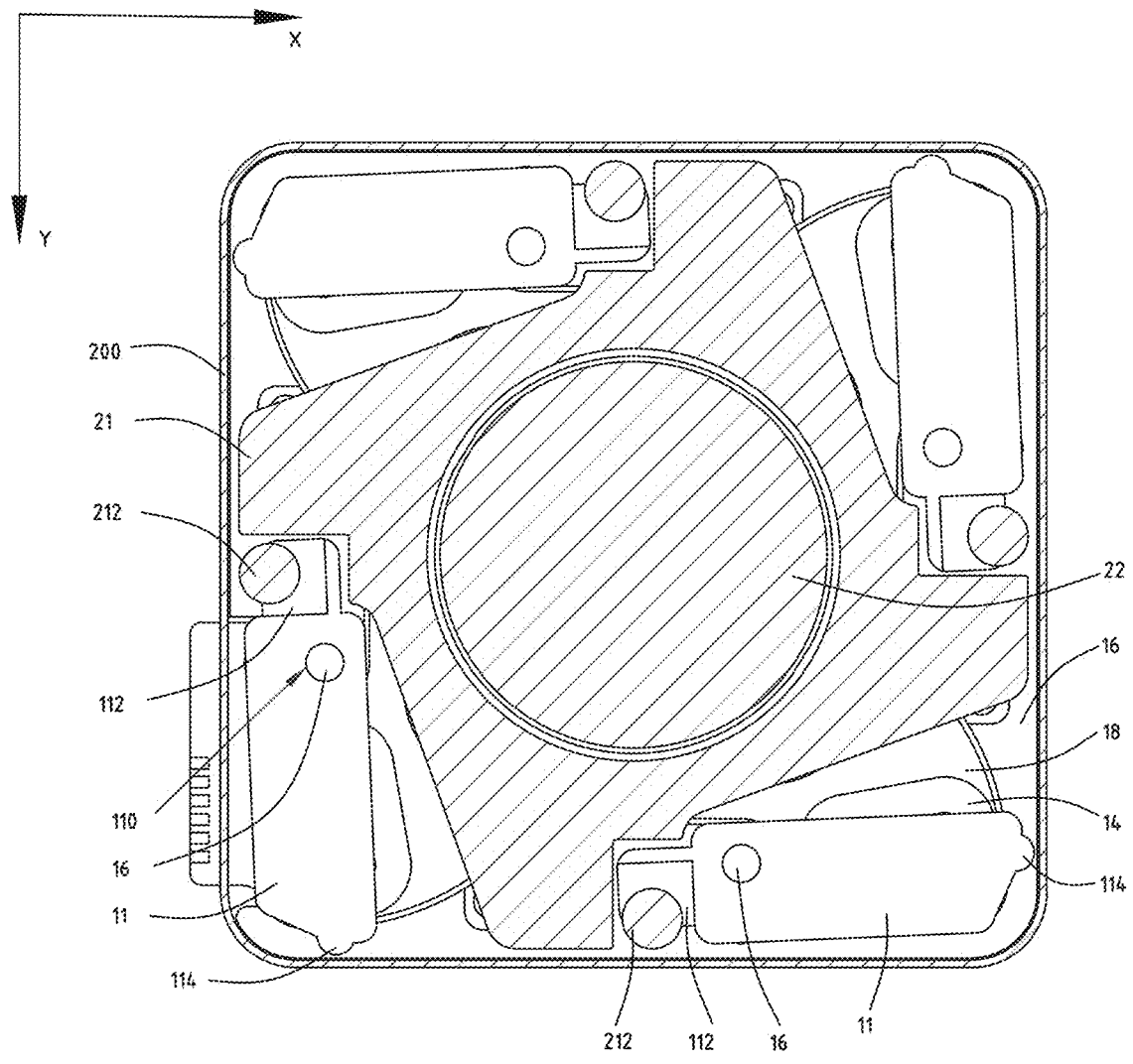
FIG. 6 is a sectional view taken along line BB in FIG. 3.

Referring to FIG. 6, when the opposing first frames 11 rotate in opposite directions, they can drive the lens holder 21 to rotate around different axes within a plane perpendicular to the optical axis OO'. For example, when driving the first frame 11 in the upper left corner of the figure to rotate clockwise and driving the first frame 11 in the lower right corner of the figure to rotate counterclockwise, the first frame 11 in the lower right corner will push the lens holder 21 towards the outer side of the paper (i.e., the object side) due to the increased height of the inclined supporting surface 112, while the first frame 11 in the upper left corner will move the lens holder 21 towards the inner side of the paper (i.e., the image side) due to the decreased height of the inclined supporting surface 112. As a result, the lens holder 21 can rotate around the X-axis (X-axis perpendicular to the optical axis OO') direction as shown in FIG. 6. Similarly, when driving the first frame 11 in the lower left corner of the figure to rotate clockwise and driving the first frame 11 in the upper right corner of the figure to rotate counterclockwise, the first frame 11 in the upper right corner will push the lens holder 21 towards the outer side of the paper (i.e., the object side) due to the increased height of the inclined supporting surface 112, while the first frame 11 in the lower left corner will move the lens holder 21 towards the inner side of the paper (i.e., the image side) due to the decreased height of the inclined supporting surface 112. As a result, the lens holder 21 can rotate around the Y-axis (Y-axis perpendicular to the X-axis and perpendicular to the optical axis OO') direction as shown in FIG. 6. That is, when driving the opposing two first frames 11 to rotate in different directions, the lens holder 21 can be driven to rotate around the X-axis or the Y-axis through the lens holder 21, and when driving all four first frames 11 to rotate at the same time, the rotation of the lens holder 21 in the first direction and the second direction can be superimposed, achieving an arbitrary angle and orientation of tilt relative to the optical axis OO'.

As such, by rotating each of the first frames 11, the lens holder 21 can be pushed to different heights or angles. By simultaneously driving multiple or opposing driving coils 14, the lens holder 21 can be driven to move the lens 22 along the optical axis OO' direction to achieve focusing function, or tilt relative to the optical axis OO' to achieve anti-shake correction function.

In this camera device 100, since the support and fixation of the lens holder 21 no longer uses a leaf spring, but uses the first frame 11, the physical support structure of the lens holder 21 is strengthened without adding a large number of components, reducing the impact of the camera device 100 dropping. Moreover, the camera device 100 does not need to consider the problem of leaf spring resonance when realizing focusing and anti-shake. It only needs to control the rotation angle of the first frame 11 according to the height design parameters of the inclined supporting surface, so that the lens holder 21 drives the lens 22 to adjust the focus and swing around a principal point 220 of the lens 22, the control method thereof is simpler. In addition, since there is no need to provide a coil on the lens holder 21 to drive its movement, it avoids the heat generated by the coil when electromagnetic driving is transferred to the lens holder 21 and the lens 22, thereby avoiding thermal expansion, and avoiding the deterioration of optical characteristics and the noise impact on the image sensor, improving the imaging quality, and having high adaptability to large image sensors and large lenses.

Of course, it can be understood that, the height change of the inclined supporting surface 112 can also be designed to decrease in the clockwise direction around the corresponding rotation axis 16, so that when each of the first frames 11 rotates along the clockwise or counterclockwise direction around the corresponding rotation axis 16 at the same time, the lens holder 21 can be pushed along the optical axis OO' direction towards the object side or the image side (the movement direction of the lens holder 21 is contrary to the previous description), which can also achieve focusing function along the optical axis OO' direction and anti-shake correction function inclined relative to the optical axis OO'.

It can be understood that, since the rotation of each of the first frames 11 is independent, the height change trend and/or height change amplitude in the direction of the corresponding rotation axis 16 of each of the first frames 11 can be the same or different. It only needs to independently control each of the first frames 11 to ensure that the height change of the inclined supporting surface 112 is controllable after each of the first frames 11 is rotated, which can achieve different focusing and/or anti-shake functions. Furthermore, in order to make the height change of the inclined supporting surface 112 the same after each of the first frames 11 rotates the same angle, thereby more convenient to control the movement distance of the lens 22. In a feasible implementation, the height change trend and height change amplitude of each inclined supporting surface 112 in the direction around the corresponding rotation axis 16 are all the same. It is not difficult to understand that the aforementioned inclined supporting surface 112 can be a sloping plane with a constant slope, or a curved surface with a gradually increasing height. As long as it is ensured that when the first frame 11 rotates around the rotation axis 16, the height of the support part supporting the lens holder 21 changes, the focusing and anti-shake movement of the lens holder 21 can be realized. In a feasible implementation, the inclined supporting surface 112 is a sloping plane which is easy to manufacture.

It should be noted that, in a preferred implementation, the support protrusion 212 on the lens holder 21 is spherical. In this way, when the inclined supporting surface 112 exerts force on the support protrusion 212 to cause relative movement therebetween, the resistance therebetween is reduced, and the relative movement therebetween is smoother, which is convenient for precise control of the rotation angle of the first frame 11, thereby precisely controlling the focusing and anti-shake operations. Preferably, a lubricant can be coated on the support protrusion 212 to further reduce the sliding resistance, such as lubricating oil, lubricating grease, etc.

Even better, in a feasible implementation, the first frame 11 is also provided with a spherical projection 114, and the base 12 abuts the spherical projection 114 on the first frame 11 to support the first frame 11 via the spherical projection 114. In this way, the resistance between the first frame 11 and the base 12 is reduced, and the relative rotation therebetween is smoother, which is more convenient for the precise control of the rotation angle of the first frame 11, thereby precisely controlling the focusing and anti-shake operations. Of course, the spherical projection 114 on the first frame 11 can also be coated with a lubricant to further reduce the sliding resistance, such as lubricating oil, lubricating grease, etc.

Furthermore, in order to provide accurate rotation angle control for the first frame 11, in a preferred implementation, the base 12 can also be provided with a position detecting element 17. The position detecting element 17 detects the rotation amount of the first frame 11 by the magnetic flux change caused by the movement of the magnet 15, thereby providing a basis for the rotation angle control of the first frame 11, which is convenient for vibration control. The number of position detecting elements 17 can be at least three or more. Preferably, in a feasible implementation, a flexible circuit board 18 is also included, and the driving coil 14 and the position detecting element 17 are both provided on the flexible circuit board 18, so as to obtain an electric control signal and perform electromagnetic driving and position detection via the flexible circuit board 18.

In addition, in order to reduce the vibration and impact caused by the relative movement between the first frame 11 and the base 12, in a feasible implementation, a shock-absorbing gel 19 can also be interposed between the base 12 and the first frame 11 to absorb the shock effect of the rippling action when the camera device 100 is suddenly powered on, which is convenient for more accurately controlling the camera device 100 to achieve the anti-shake function.

It can be understood that, although the number of the first frames 11 is four in the preceding implementation, in other implementation, as long as it is possible to ensure that the movement of the lens 22 in the direction of the optical axis OO' and the tilt relative to the optical axis OO' can be realized by the rotation of the first frames 11, the number of the first frames 11 can be three, five, six, seven, or more. Correspondingly, in order to enable each of the first frames 11 to rotate relatively independently, the rotation axes 16 on the base 12 can also be three, five, six, seven, or more, so as to correspond to the first frames 11 one by one and fix the corresponding first frames 11 to the base 12 through rotation shaft holes 110 on each of the first frames 11 in a rotatable manner.

Figure 9:
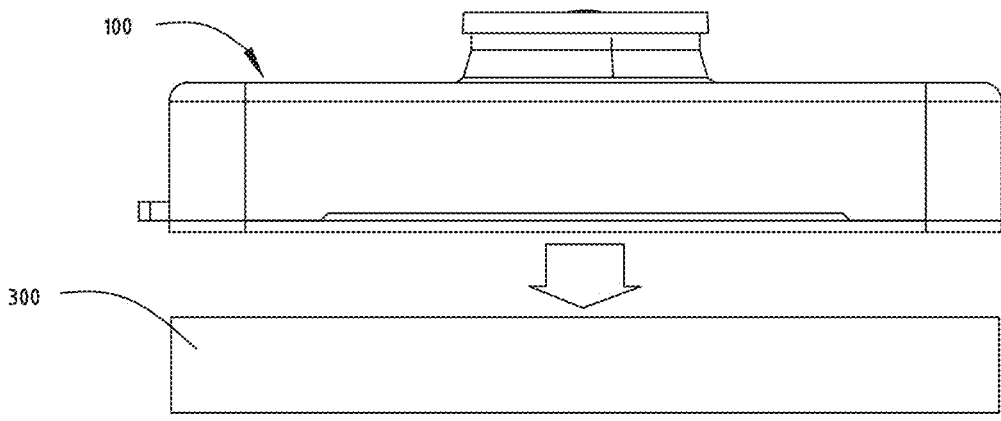
FIG. 9 is a schematic structural view of a camera system provided by an embodiment of the present disclosure.

The embodiment of the present disclosure relates to a camera system, as shown in FIG. 9, including: an image sensing unit 300 and the camera device 100 described in the above embodiment.

Compared with the prior art, the camera device 100 described in the above embodiment is arranged on the object side of the image sensing unit 300 to form a camera system capable of imaging. The camera system realizes focusing and anti-shake functions by using an inclined supporting surface, without the need to additionally set a leaf spring, thereby avoiding the problems of reduced control performance caused by the resonance of the leaf spring and the weight distribution problem caused by the width of the leaf spring.

Figure 10:
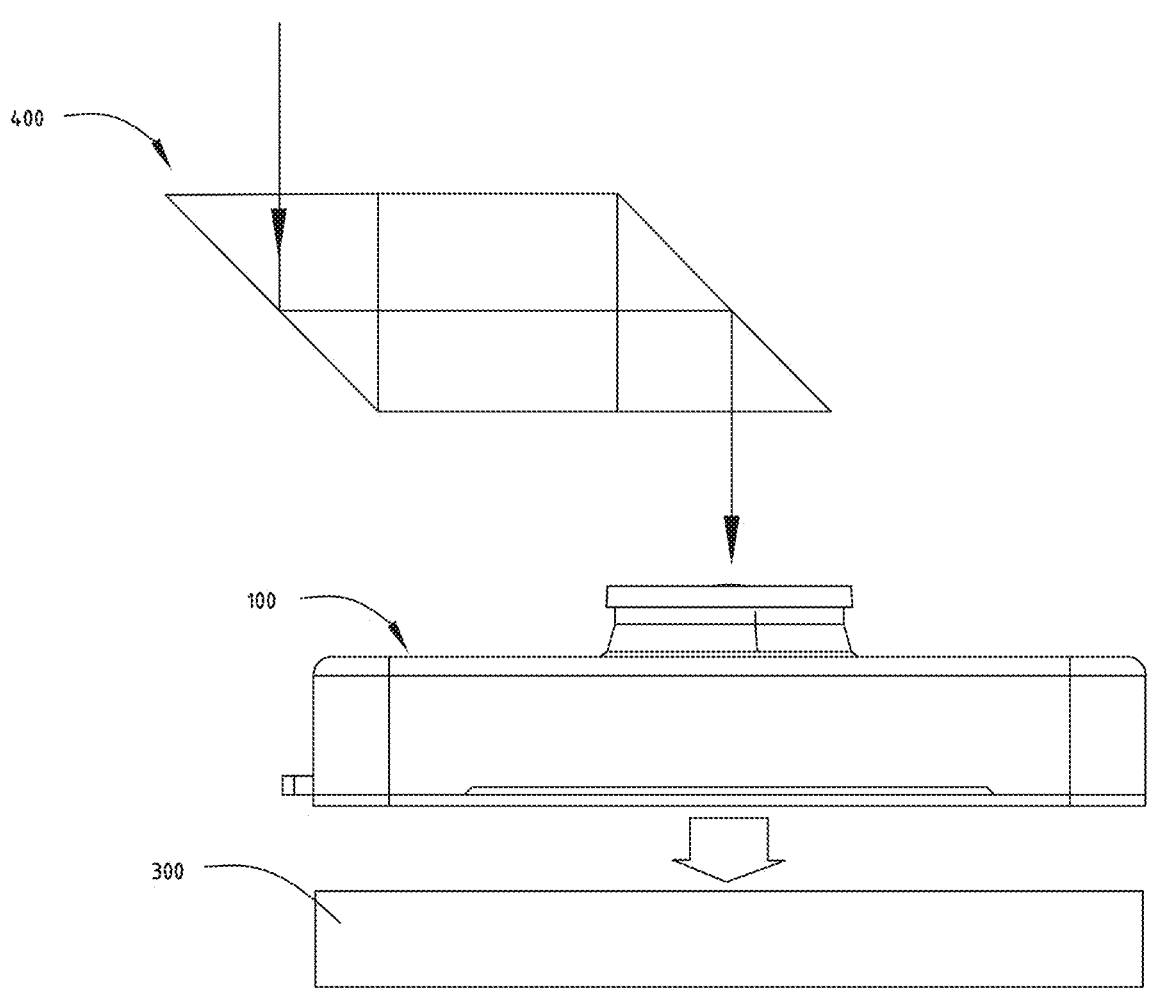
FIG. 10 is a schematic structural view of another camera system provided by an embodiment of the present disclosure.

The embodiment of the present disclosure further relates to another camera system, as shown in FIG. 10, including: a periscope optical mechanism 400 and the camera device 100 described in the above embodiment.

Compared with the prior art, the camera device 100 described in the above embodiment is arranged on the periscope optical mechanism 400, which can also realize focusing and anti-shake functions by using a inclined supporting surface, without the need to additionally set a leaf spring, thereby avoiding the problems of reduced control performance caused by the resonance of the leaf spring and the weight distribution problem caused by the width of the leaf spring.

Figure 11:
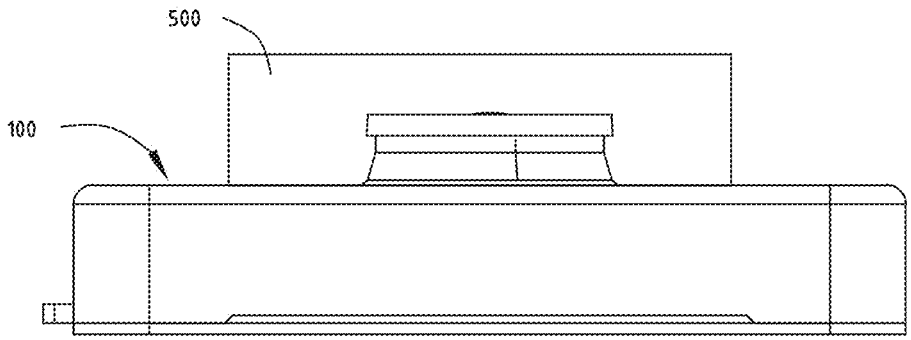
FIG. 11 is a schematic structural view of a camera provided by an embodiment of the present disclosure.

The embodiment of the present disclosure further relates to a camera, as shown in FIG. 11, including: an aperture mechanism 500 and the camera device 100 described in the above embodiment.

Compared with the prior art, the camera device 100 described in the above embodiment is arranged in the camera to cooperate with the aperture mechanism 500, which can also realize focusing and anti-shake functions by using a inclined supporting surface, without the need to additionally set a leaf spring, thereby avoiding the problems of reduced control performance caused by the resonance of the leaf spring and the weight distribution problem caused by the width of the leaf spring.

It can be understood that, the foregoing camera device, camera module, and camera can be applied to various electronic devices with photographing functions, such as mobile phones, tablets, smart watches and other portable terminals, as well as notebook computers or other terminals.

Figure 12:
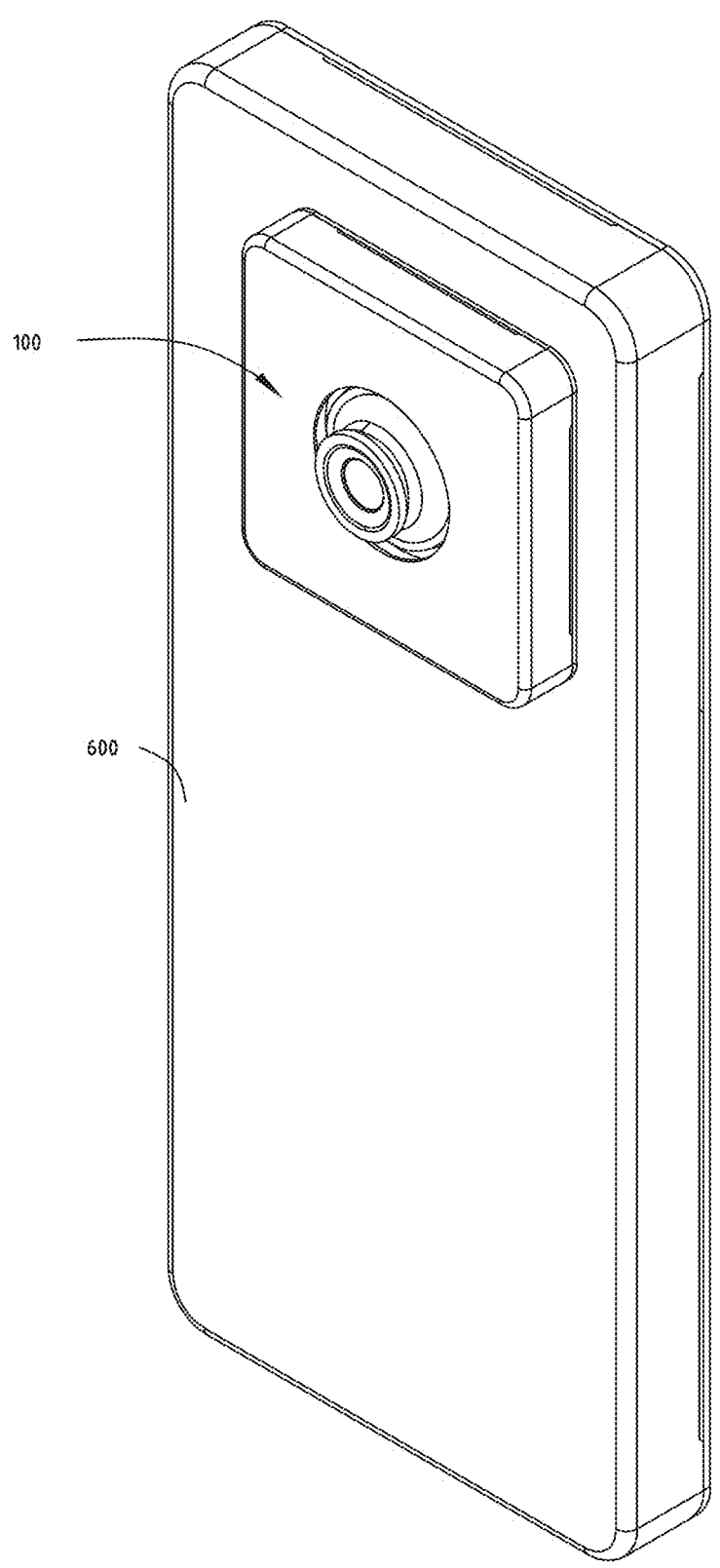
FIG. 12 is a schematic structural view of an electronic apparatus provided by an embodiment of the present disclosure

The embodiment of the present disclosure further relates to an electronic device with a photographing function, as shown in FIG. 12, including: a device main body 600, and the camera device 100 described in the above embodiment and provided on the device main body.

For the prior art, setting the camera device 100 described in the above embodiment on the electronic device can also realize focusing and anti-shake functions by using a inclined supporting surface, without the need to additionally set a leaf spring, thereby avoiding the problems of reduced control performance caused by the resonance of the leaf spring and the weight distribution problem caused by the width of the leaf spring.

Those of ordinary skill in the art can understand that the above various embodiments are specific embodiments for realizing the present invention, and in actual applications, various changes can be made to it in form and detail without departing from the spirit and scope of the present invention.

What is claimed is:

1. A camera device, comprising a driving mechanism and a lens module having an optical axis, wherein the driving mechanism comprises a base and a first frame rotatably provided on the base, the base is provided with a first magnetic yoke and a driving coil, the first frame is provided with a magnet and has a inclined supporting surface inclined with respect to the optical axis, the first magnetic yoke and the magnet are arranged opposite to each other in the direction of the optical axis, the magnet exerts an attractive force on the first magnetic yoke in the direction of the optical axis to press the first frame on the base;

the lens module comprises a lens holder pressing on the first frame, and the first frame supports the lens holder via the inclined supporting surface;

when the driving coil is energized to generate a magnetic field, the first frame is driven by the magnet to rotate in a plane perpendicular to the direction of the optical axis, and the first frame drives the lens holder to move in the direction of the optical axis or tilt with respect to the optical axis via the rotating inclined supporting surface.

2. The camera device according to claim 1, comprising a plurality of the first frames, and the plurality of first frames are arranged on the base substantially equidistantly in a direction surrounding the optical axis.

3. The camera device according to claim 2, wherein the plurality of the first frames drive the lens holder to move in the same direction along the optical axis via the rotating inclined supporting surface, thereby driving the lens holder to move along the optical axis direction.

4. The camera device according to claim 2, wherein the base is provided with a plurality of protruding rotation shafts corresponding to the plurality of first frames one by one, and each of the first frames is provided with a rotation shaft hole, and the rotation shaft is inserted through the corresponding rotation shaft hole to rotatably set the corresponding first frame on the base.

5. The camera device according to claim 4, wherein the height of the inclined supporting surface increases along the direction surrounding the corresponding rotation shaft.

6. The camera device according to claim 5, wherein the height of the inclined supporting surface increases in a clockwise direction around the corresponding rotation axis.

7. The camera device according to claim 5, wherein the height change trend and height change magnitude of each inclined supporting surface in the direction surrounding the corresponding rotation axis are the same.

8. The camera device according to claim 1, wherein the first frame is designated as four, and the four first frames are arranged in pairs opposite to each other, two of the first frames arranged opposite to each other is configured for driving the lens holder to move in opposite directions along the optical axis via the rotating inclined supporting surface, thereby driving the lens holder to rotate around a first direction perpendicular to the optical axis;

the other two first frames arranged opposite to each other is configured for driving the lens holder to move in opposite directions along the optical axis via the rotating inclined supporting surface, thereby driving the lens holder to rotate around a second direction perpendicular to the optical axis and the first direction;

the four first frames rotate simultaneously, so that the rotation of the lens holder in the first direction and the rotation in the second direction are superimposed, and the lens holder tilts with respect to the optical axis.

9. The camera device according to claim 1, wherein the projection of the driving coil and the first frame in the direction of the optical axis intersects each other.

10. The camera device according to claim 1, wherein the lens holder is provided with a spherical support protrusion, and the inclined supporting surface abuts against the spherical support protrusion on the lens holder to support the lens holder via the spherical support protrusion on the lens holder.

11. The camera device according to claim 1, wherein the first frame is provided with a spherical protrusion, and the base abuts against the spherical protrusion on the first frame to support the first frame via the spherical protrusion on the first frame.

12. The camera device according to claim 1, wherein a position detecting element is provided on the base to detect the rotation amount of the first frame.

13. The camera device according to claim 1, wherein the lens module includes a lens fixed on the lens holder and a second magnetic yoke, the second magnetic yoke and the magnet are arranged opposite to each other in the direction of the optical axis, the magnet exerts an attractive force on the second magnetic yoke in the direction of the optical axis to press the lens holder on the first frame.

14. The camera device according to claim 1, wherein spherical protrusions are provided on the object-side surface and image-side surface of the lens holder, and recesses are provided on the first frame in contact with the spherical protrusions and receiving the spherical protrusions therein, the first frame applies force to the spherical protrusions of the lens holder via the recesses to press the lens holder on the first frame.

15. An electronic apparatus, comprising a device main body, and a camera device as claimed in claim 1.

* * * * *